United States Patent
Koyama (10) Patent No.: US 7,882,819 B2
(45) Date of Patent: Feb. 8, 2011

(54) ENGINE

(75) Inventor: Yoshiaki Koyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 456 days.

(21) Appl. No.: 12/009,178

(22) Filed: Jan. 17, 2008

(65) Prior Publication Data

US 2008/0173275 A1    Jul. 24, 2008

(30) Foreign Application Priority Data

Jan. 18, 2007 (JP) .............................. 2007-009418

(51) Int. Cl.
- F01M 1/02 (2006.01)
- F01M 9/10 (2006.01)
- F01M 11/02 (2006.01)

(52) U.S. Cl. .............................. 123/196 R; 123/192.1; 123/192.2; 184/14; 184/15.1; 184/15.2; 184/15.3

(58) Field of Classification Search ............. 123/196 R, 123/192.2, 192.1, 195 H; 184/6.5, 14, 15.1–15.3
See application file for complete search history.

(56) References Cited

U.S. PATENT DOCUMENTS

| | | | |
|---|---|---|---|
| 5,743,230 A * | 4/1998 | Yamazaki et al. | 123/195 H |
| 5,954,159 A * | 9/1999 | Nakamura | 184/11.2 |
| 6,189,499 B1 | 2/2001 | Iwata et al. | |
| 6,382,171 B1 | 5/2002 | Narita et al. | |
| 2004/0244757 A1 | 12/2004 | Takeuchi | |

FOREIGN PATENT DOCUMENTS

| | | |
|---|---|---|
| EP | 0789164 A1 | 8/1997 |
| EP | 1505265 A2 | 2/2005 |
| GB | 562487 | 7/1944 |
| JP | 2000-065146 | 3/2000 |

OTHER PUBLICATIONS

European Search Report for Application No. EP08000120, dated Feb. 26, 2008.

* cited by examiner

Primary Examiner—Noah Kamen
Assistant Examiner—Hung Q Nguyen
(74) Attorney, Agent, or Firm—Nelson Mullins Riley & Scarborough LLP; Anthony A. Laurentano

(57) ABSTRACT

A tensioner for applying tension to a balancer drive chain is mounted in a balancer housing which accommodates balancer shafts. Oil is supplied from a reservoir chamber to the tensioner. An oil jet member for lubricating the balancer drive chain is mounted at a position downstream in an oil flow direction from the reservoir chamber. Therefore, while enabling foreign matter contained in the oil to be discharged from the oil jet member without being accumulated within the tensioner, a predetermined pressure can be maintained in the reservoir chamber by a resistance to the flow of oil passing through the oil jet member. Also, a constriction is provided between the reservoir chamber and the oil jet member. Therefore, it is difficult for the oil to flow out of the reservoir chamber even after stoppage of an engine, thereby supplying the oil to the tensioner upon the next start of the engine without delay. Thus, it is possible to prevent the foreign matter from entering the tensioner for the balancer drive chain.

5 Claims, 8 Drawing Sheets

ENGINE

BACKGROUND OF THE INVENTION

1. Field of the Invention

The present invention relates to an engine having an endless power transmitting member for transmitting a drive force between a drive shaft and a follower shaft, a hydraulic tensioner for providing tension to the endless power transmitting member, an oil pump for supplying oil to the tensioner, and a reservoir chamber provided in an oil passage extending from the oil pump to the tensioner so as to store the oil supplied to the tensioner.

2. Description of the Related Art

Japanese Patent Application Laid-open No. 2000-65146 discloses a system in which a tensioner is mounted in a balancer housing disposed below a crankshaft of an engine, an oil pump is accommodated in the balancer housing, and a portion of oil discharged by the oil pump is supplied to the tensioner to provide tension to a balancer drive chain.

In this conventional system, in order to prevent foreign matter contained in the oil from being supplied to an oil chamber in the tensioner and hence not being discharged therefrom, a filter is disposed between the tensioner and a reservoir chamber which stores a pressurized oil and which is formed between the oil pump and the tensioner, and the foreign matter is filtered by the filter. However, if the filter is mounted, correspondingly the number of parts is increased. Thus, it is desired to prevent the foreign matter from entering the tensioner without requiring the additional filter.

SUMMARY OF THE INVENTION

The present invention is achieved in view of the above circumstances, and it is an object of the invention to prevent foreign matter from entering a tensioner without use of a filter.

In order to achieve the above object, according to a first feature of the present invention, there is provided an engine having an endless power transmitting member for transmitting a drive force between a drive shaft and a follower shaft; a hydraulic tensioner for providing a tension to the endless power transmitting member; an oil pump for supplying oil to the tensioner; a reservoir chamber provided in an oil passage extending from the oil pump to the tensioner so as to store the oil supplied to the tensioner; and an oil jet member which injects the oil to a lubricated portion and which communicates with the reservoir chamber.

A drive balancer shaft 18 in accordance with an embodiment of the invention corresponds to the follower shaft or the balancer shaft of the present invention; a crankshaft 20 in the embodiment corresponds to the drive shaft of the present invention; and a balancer drive chain in the embodiment corresponds to the endless power transmitting member of the present invention.

With the foregoing arrangement, the oil is supplied from the oil pump through the reservoir chamber to the hydraulic tensioner for applying tension to the endless power transmitting member, and the oil jet member for injecting the oil to the lubricated portion communicates with the reservoir chamber. Therefore, while enabling the foreign matter contained in the oil to be discharged from the oil jet member without flowing into the tensioner, a predetermined pressure can be maintained in the reservoir chamber by a resistance to the flow of oil passing through the oil jet member.

The engine can further include a constriction provided between the reservoir chamber and the oil jet member.

The constriction is provided between the reservoir chamber and the oil jet member. Therefore, it is difficult for the oil to be discharged from the reservoir chamber even after stoppage of the engine, thereby supplying the oil to the tensioner upon the next start of the engine without delay, and also enhancing the responsiveness of the tensioner when the tension of the balancer drive chain has fluctuated.

In addition, the drive shaft can be a crankshaft, the follower shaft can be a balancer shaft, and the endless power transmitting member can be a balancer drive chain.

In addition, the engine can further comprise a balancer housing which includes the reservoir chamber and the oil jet member, and which accommodates the balancer shaft.

The reservoir chamber in accordance with one embodiment is provided in the balancer housing which accommodates the balancer shaft, and hence the engine has a compact structure. In addition, the oil jet member is mounted in the balancer housing, and hence the oil passage connecting the reservoir chamber and the oil jet member to each other can be simplified.

The above and other objects, features and advantages of the invention will become apparent from preferred embodiments taken in conjunction with the accompanying drawings.

DETAILED DESCRIPTION OF THE ILLUSTRATED EMBODIMENT

Figure 1:
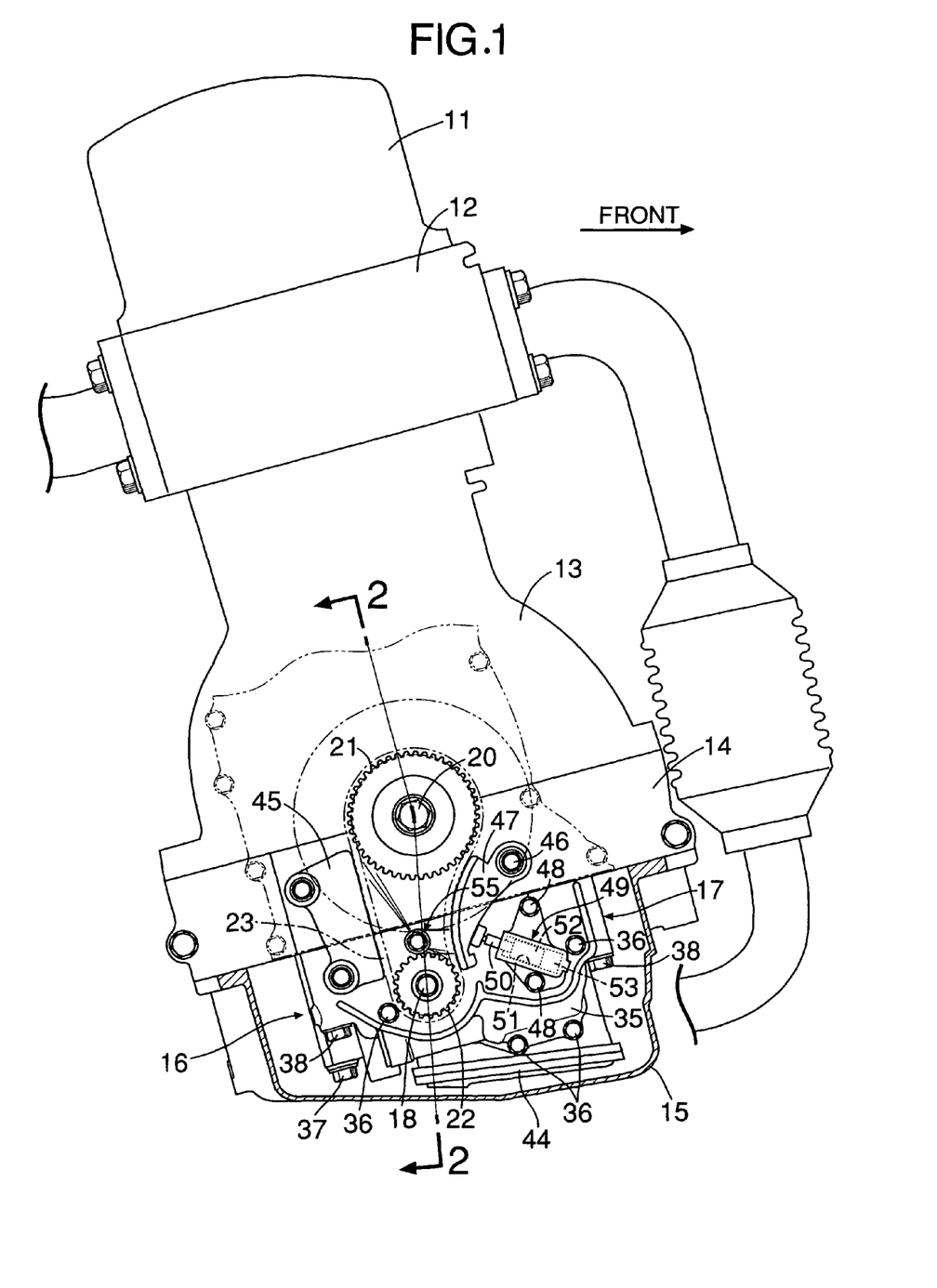
FIG. 1 is a front view of an engine including a balancer device, according to an embodiment of the present invention.
Figure 2:
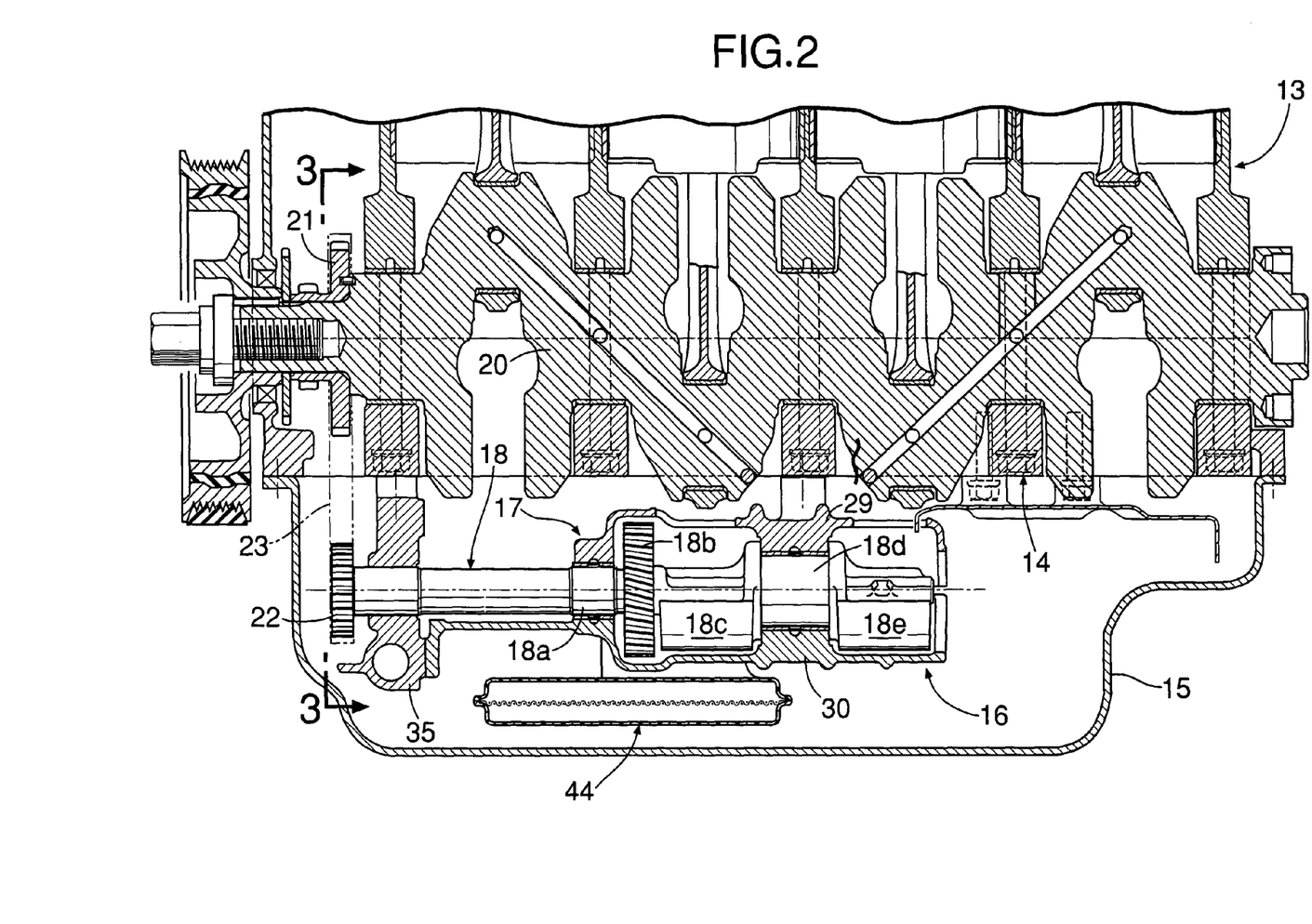
FIG. 2 is a sectional view taken along a line 2-2 in FIG. 1.
Figure 4:
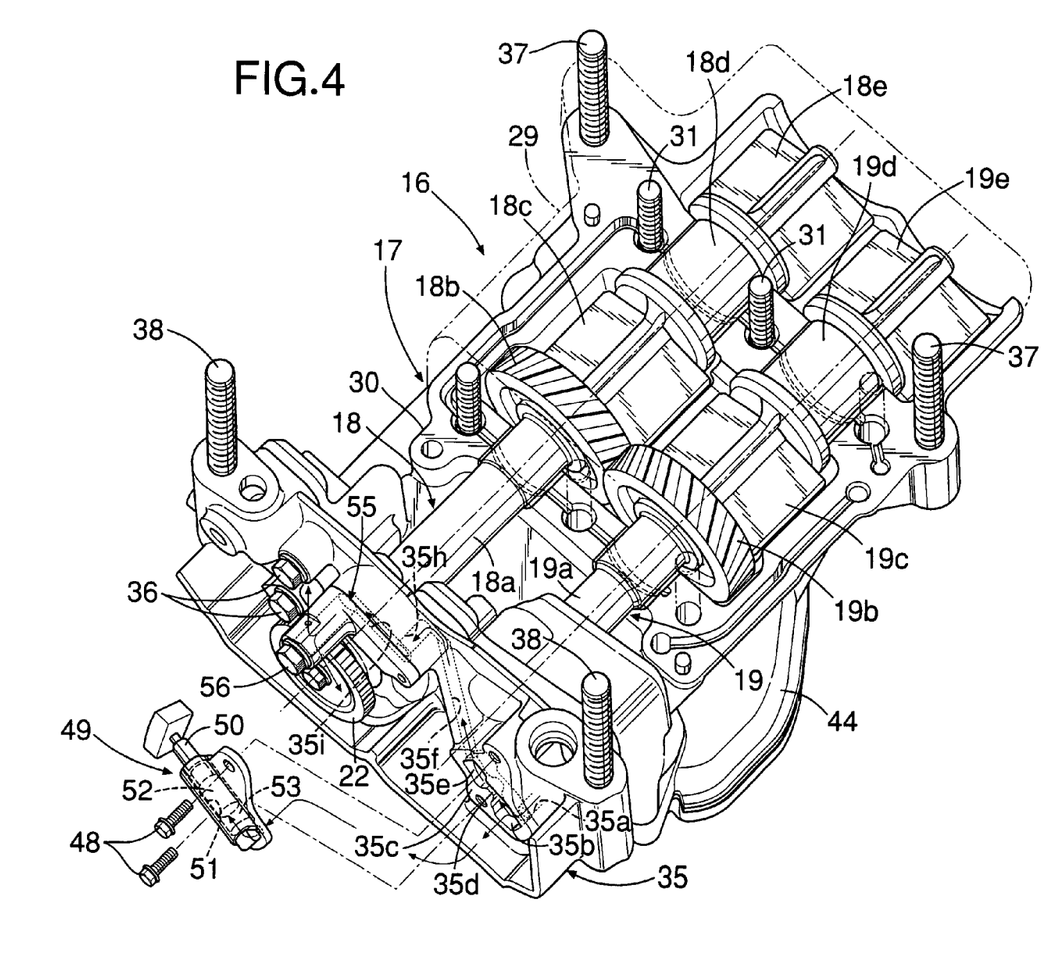
FIG. 4 is a perspective view of a balancer device with an upper housing member removed.
Figure 5:
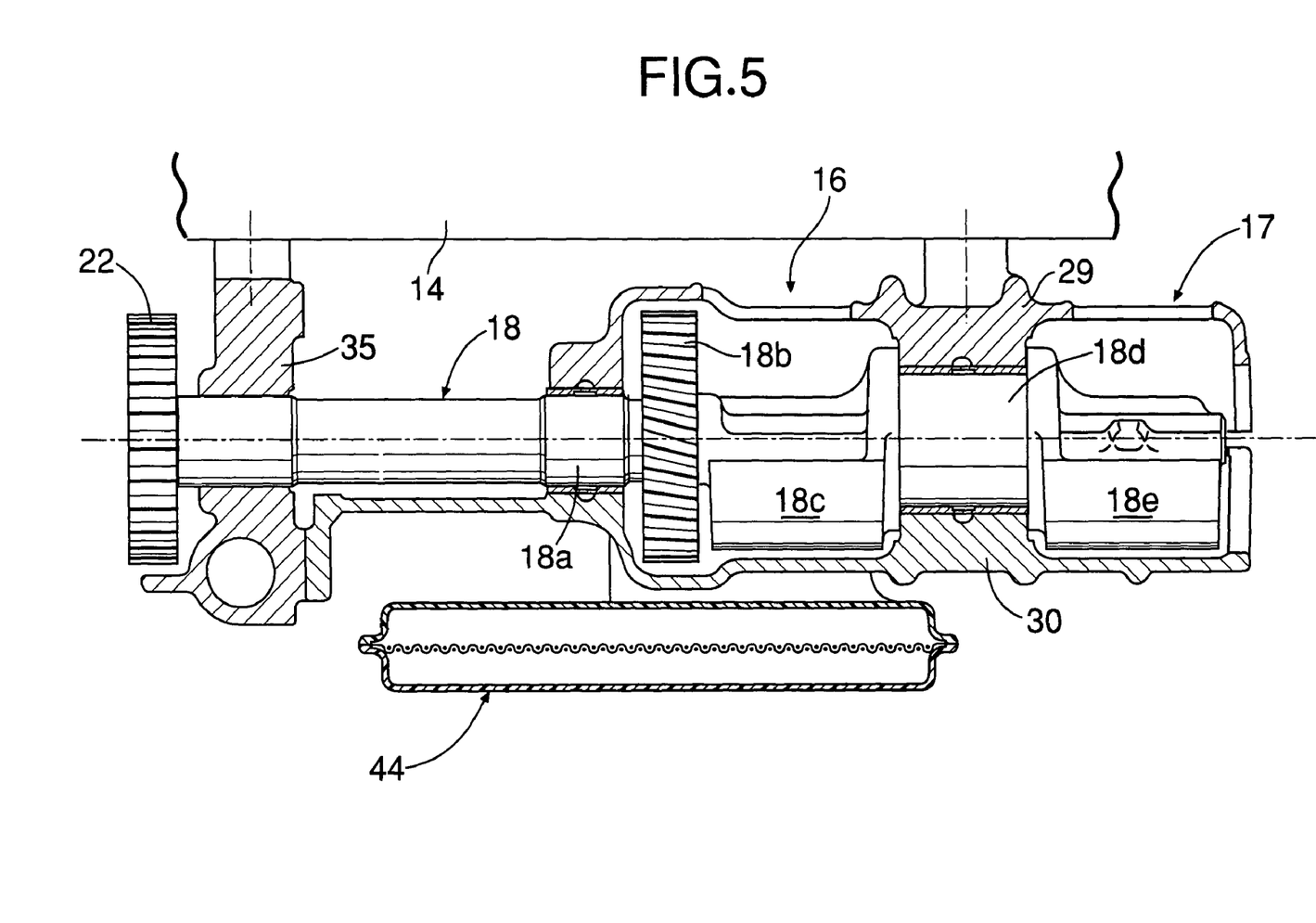
FIG. 5 is a sectional view taken along a line 5-5 in FIG. 3.

As shown in FIG. 1, an outer shell of a vehicle in-line 4-cylinder engine E comprises, sequentially from top to down, a head cover 11, a cylinder head 12, a cylinder block 13, a lower block 14 and an oil pan 15, which are coupled or laminated together. A secondary balancer device 16 is fixed to a lower surface of the lower block 14, and accommodated within the oil pan 15. The secondary balancer device 16 includes a drive balancer shaft 18 and a follower balancer shaft 19 (see FIG. 4) which are supported in a balancer housing 17. A balancer drive chain 23 provides connection between a drive sprocket 21 and a follower sprocket 22. The drive sprocket 21 is mounted at an end of a crankshaft 20 supported between the cylinder block 13 and the lower block 14. The follower sprocket 22 is mounted at an end of the drive balancer shaft 18.

As shown in FIGS. 2 to 6, the balancer housing 17 of the secondary balancer device 16 comprises: an upper housing member 29 and a lower housing member 30 which are coupled to each other by a plurality of bolts 31; and an end housing member 35 coupled to one end of the upper housing member 29 and one end of the lower housing member 30 by a plurality of bolts 36. The balancer housing 17 is fixed to the lower block 14 by tightening two bolts 37, 37 passed through the lower housing member 30 and the upper housing member 29 into the lower block 14, and tightening an additional two bolts 38, 38 passed through the end housing member 35 into the lower surface of the lower block 14.

Provided on the drive balancer shaft 18 of the secondary balancer device 16, sequentially from one end to the other end thereof, are the follower sprocket 22, a first journal 18a, a drive gear 18b, a first balancer weight 18c, a second journal 18d, and a second balancer weight 18e. The first and second journals 18a and 18d are supported so as to be sandwiched between the upper housing member 29 and the lower housing member 30 (see FIG. 5). Provided on the follower balancer shaft 19 of the secondary balancer device 16, sequentially from one end to the other end thereof, are a first journal 19a, a follower gear 19b, a first balancer weight 19c, a second journal 19d, and a second balancer weight 19e. The first and second journals 19a and 19d are supported so as to be sandwiched between the upper housing member 29 and the lower housing member 30 (see FIG. 6).

An oil pump 41 (see FIG. 6) is mounted at one end of the follower balancer shaft 19 extending toward the end housing member 35. The oil pump 41 comprises a well-known trochoid pump, including an inner rotor 42 fixed to the follower balancer shaft 19 and an outer rotor 43 rotatably supported on the end housing member 35 and meshed with the inner rotor 42. As trainer 44 is mounted on a lower surface of the lower housing member 30 to situate below a surface of oil stored in the oil pan 15. The strainer 44 is connected to a suction port 41a of the oil pump 41 through an oil passage 30a formed in the lower housing member 30. A discharge port 41b of the oil pump 41 communicates with a main gallery (not shown), and also communicates with a reservoir chamber 35b formed in an outer end face of the end housing member 35 through an oil passage 35a formed in the end housing member 35.

Figure 3:
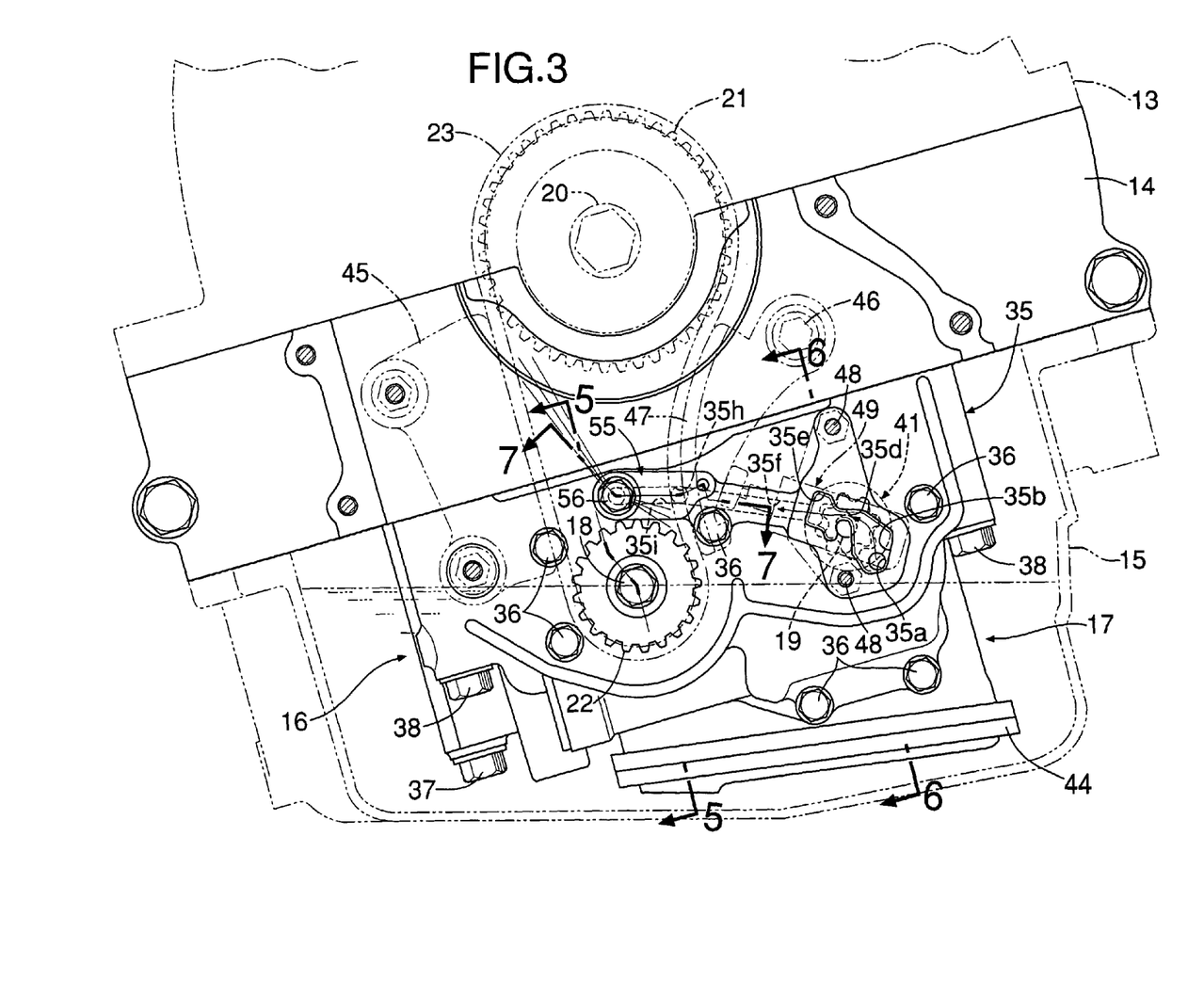
FIG. 3 is a sectional view taken along a line 3-3 in FIG. 2.
Figure 6:
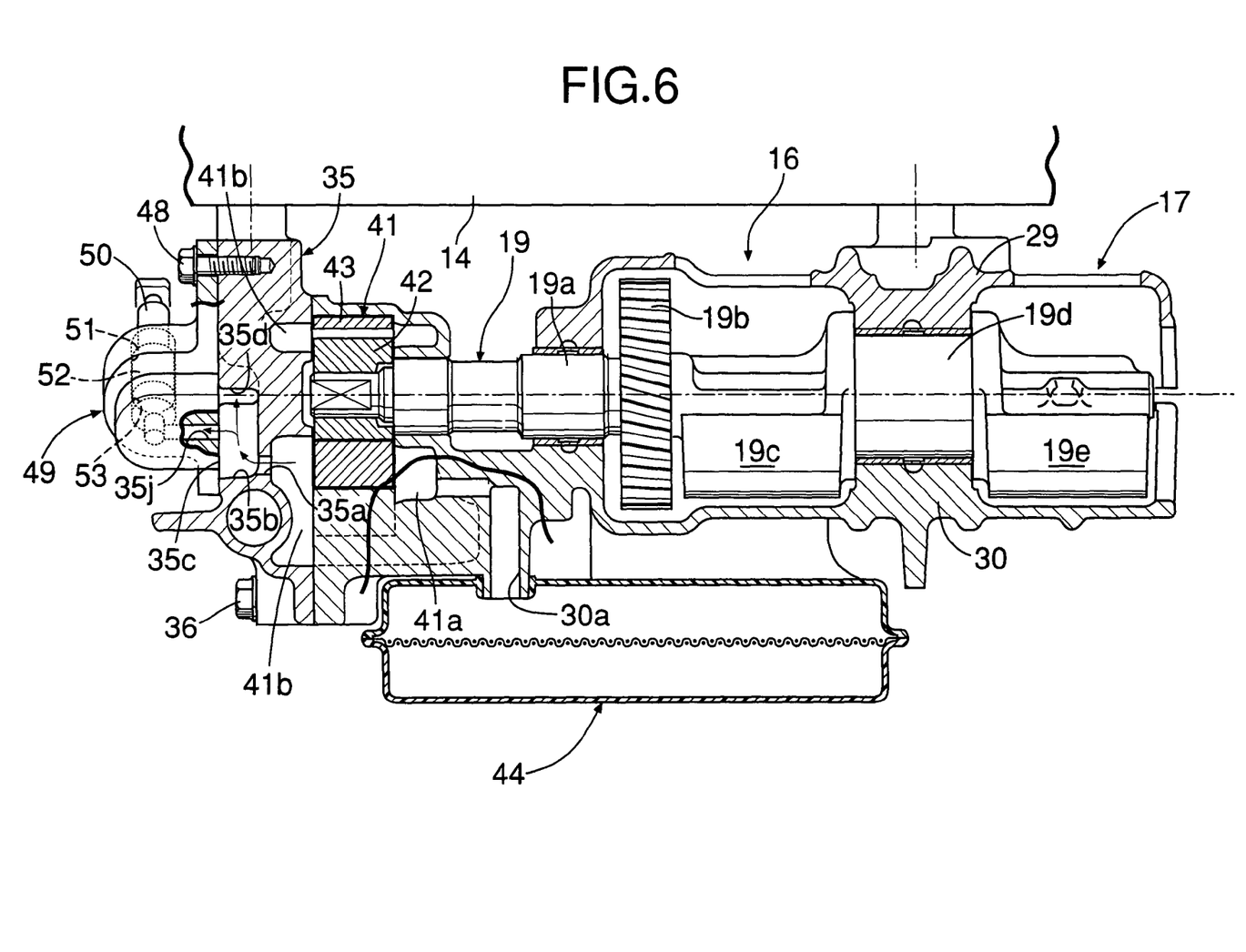
FIG. 6 is a sectional view taken along a line 6-6 in FIG. 3.

As shown in FIGS. 1, 3 and 6, the balancer drive chain 23 is wound around the drive sprocket 21 mounted on the crankshaft 20 and the follower sprocket 22 mounted on the drive balancer shaft 18. A tensioned side of the balancer drive chain 23 is guided by a chain guide 45. A loosened or relaxed side of the balancer drive chain 23 is pressed by a shoe 47 pivotally supported by a pivot shaft 46. A tensioner 49 is fixed to a surface of the end housing member 35 of the balancer housing 17 by bolts 48, 48. The shoe 47 is pushed against the balancer drive chain 23 by an output rod 50 of the tensioner 49.

The tensioner 49 is fixed to a mounting seat 35c which is formed on the end housing member 35 so as to surround the reservoir chamber 35b. The output rod 50 is connected to a piston 52 slidably fitted in a cylinder 51 formed within the tensioner 49. An oil chamber 53 behind the piston 52 communicates with the reservoir chamber 35b through oil passage 35j.

Figure 7:
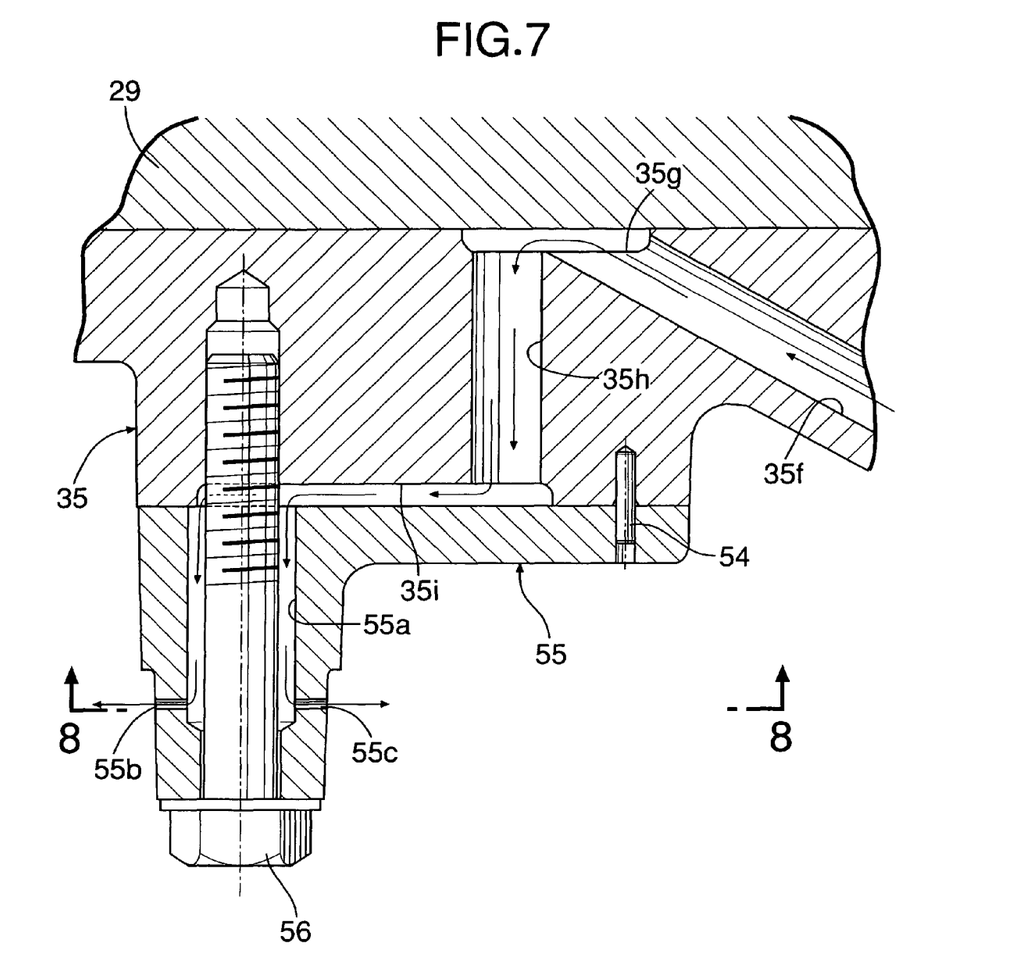
FIG. 7 is a sectional view taken along a line 7-7 in FIG. 3.
Figure 8:
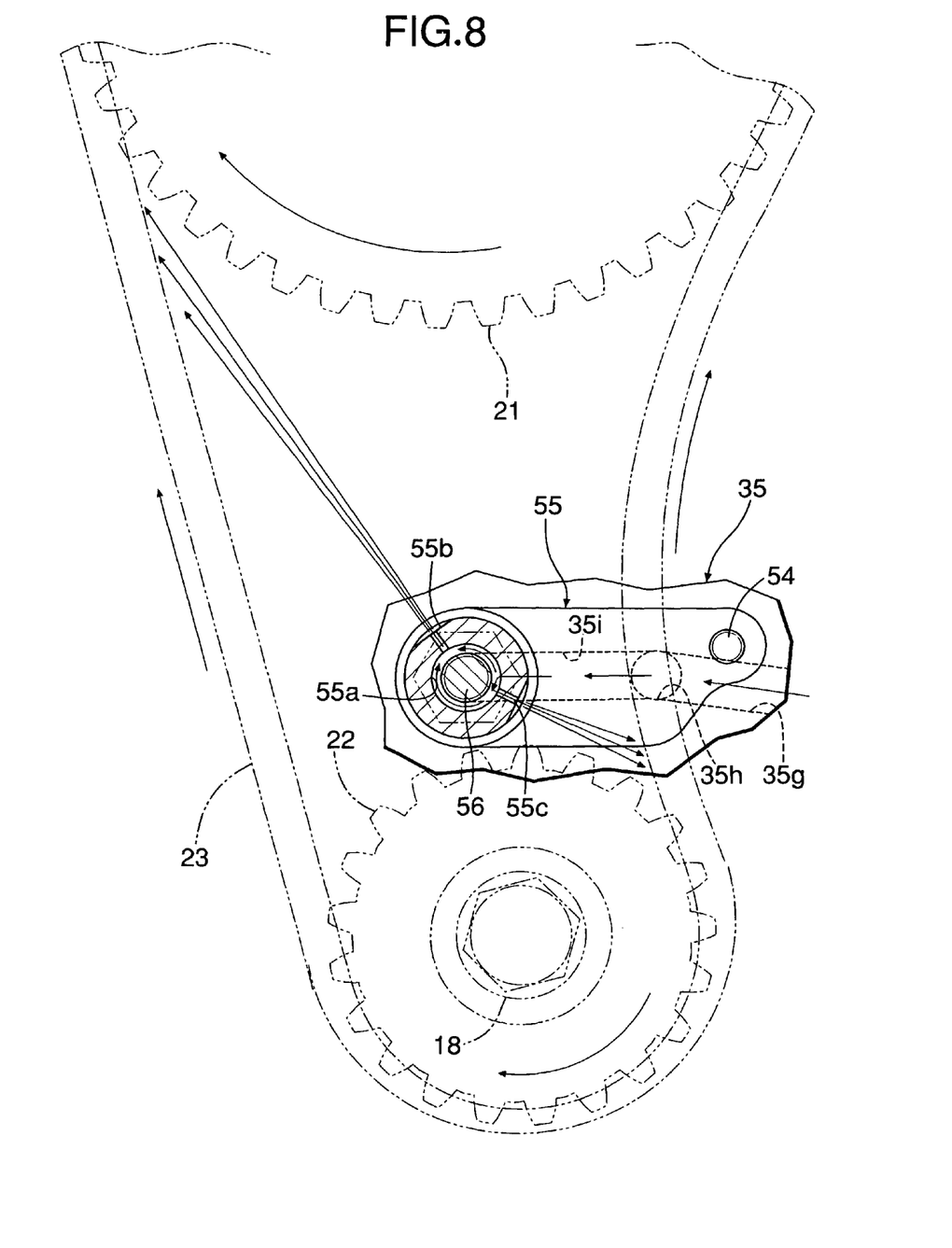
FIG. 8 is a sectional view taken along a line 8-8 in FIG. 7.

As shown in FIGS. 3, 7 and 8, the reservoir chamber 35b communicates with a rear chamber 35e through a constriction 35d, and the rear chamber 35e communicates with a second communication chamber 35i formed in a parting face of the end housing member 35 through oil passage 35f formed through the end housing member 35, a first communication chamber 35g formed in the parting face of the end housing member 35, and an oil passage 35h formed through the end housing member 35. An oil jet member 55 is fixed by a bolt 56 to the parting face of the end housing member 35 via a knock pin 54. The oil jet member 55 has a bolt bore 55a having a diameter larger than an outer diameter of the bolt 56, and a first jet member nozzle 55b and a second jet member nozzle 55c which communicate with the bolt bore 55a.

The crankshaft 20 and the drive balancer shaft 18 are rotated in a clockwise direction, whereby the first jet member nozzle 55b is directed to meshed portions of the drive sprocket 21 of the crankshaft 20 and the balancer drive chain 23, and the second jet member nozzle 55c is directed to meshed portions of the follower sprocket 22 of the drive balancer shaft 18 and the balancer drive chain 23.

The operation of the embodiment of the present invention having the above-described structure will be described below.

With the operation of the engine E, the rotational energy of the crankshaft 20 is transmitted to the drive balancer shaft 18 through the drive sprocket 21, the balancer drive chain 23 and the follower sprocket 22, and the rotational energy of the drive balancer shaft 18 is transmitted to the follower balancer shaft 19 through the drive gear 18b and the follower gear 19b. In this structure, the number of teeth of the drive sprocket 21 of the crankshaft 20 is set to be twice the number of teeth of the follower sprocket 22 of the drive balancer shaft 18, and the number of teeth of the drive gear 18b is set to be equal to the number of teeth of the follower gear 19b. Therefore, the drive balancer shaft 18 and the follower balancer shaft 19 are rotated in opposite directions at a rotational speed twice the rotational speed of the crankshaft 20, and a secondary vibration of the engine E is reduced by the first and second balancer weights 18c, 19c; 18e, 19e mounted on the drive balancer shaft 18 and the follower balancer shaft 19.

When the oil pump 41 mounted at the end of the follower balancer shaft 19 is operated, the oil within the oil pan 15 flows from the strainer 44, through the oil passage 30a of the lower housing member 30 and the suction port 41a of the oil pump 41, to be discharged from the discharge port 41b. The discharged oil is used for lubrication and the like of various portions of the engine E, but a portion thereof is supplied to the oil chamber 53 in the tensioner 49 through the oil passage 35a, the reservoir chamber 35b and the oil passage 35j in the end housing member 35. As a result, the piston 52 is advanced relative to the cylinder 51 of the tensioner 49, and the output rod 50 integral with the piston 52 pushes the shoe 47 against the balancer driver chain 23, thereby maintaining the tension of the balancer driver chain 23 at an appropriate level.

As described above, the reservoir chamber 35b is incorporated in a passage extending from the oil pump 41 to the tensioner 49, and hence a fluctuation in pressure discharged from the oil pump 41 can be absorbed in the reservoir chamber 35b, thereby stabilizing operation of the tensioner 49.

A portion of the oil in the reservoir chamber 35b is passed through the constriction 35d, the rear chamber 35e, the oil passage 35f, the first communication chamber 35g, the oil passage 35h, the second communication chamber 35i and the bolt bore 55a, and injected from the first jet member nozzle 55b and the second jet member nozzle 55c. The oil injected from the first jet member nozzle 55b to the meshed portions of the drive sprocket 21 of the crankshaft 20 and the balancer drive chain 23 lubricates the entire engaged portions of the drive sprocket 21 and the balancer drive chain 23. The oil injected from the second jet member nozzle 55c to the meshed portions of the follower sprocket 22 of the drive balancer shaft 18 and the balancer drive chain 23 lubricates the entire engaged sections of the follower sprocket 22 and the balancer drive chain 23.

In this manner, it is possible to enhance the lubricating effect of the oil by injecting the oil toward the two meshed regions in the balancer drive chain 23.

When foreign matter contained in the oil flows into the oil chamber 53 in the tensioner 49, there is a possibility that the foreign matter is not discharged from the oil chamber 53 which may hinder the operation of the tensioner 49. To prevent this from occurring, a filter has been conventionally disposed between the reservoir chamber 35b and the tensioner 49. However, according to the present embodiment, the oil in the reservoir chamber 35b is discharged from the first and second jet member nozzles 55b and 55c together with the foreign matter contained in the oil. Therefore, without the conventionally required filter, it is possible to prevent the foreign matter from flowing into the oil chamber 53 in the tensioner 49.

Also, because the constriction 35d is provided between the reservoir chamber 35b and the oil jet member 55, the pressure of oil injected from the oil jet member 55 can be adjusted as desired by adjusting a cross-sectional area of the constriction 35d. Further, a predetermined pressure can be maintained in the reservoir chamber 35b by a resistance to the flow of oil passing through the oil jet member 55.

In addition, it is difficult for the oil to flow out of the reservoir chamber 35b even after stoppage of the engine E by virtue of the constriction 35d provided at a position downstream of the reservoir chamber 35b, thereby supplying the oil to the tensioner 49 upon the next start of the engine without delay, and also enhancing the responsiveness of the tensioner when the tension of the balancer drive chain 23 has fluctuated.

Further, because the reservoir chamber 35b is provided in the balancer housing 17, the engine E has a compact structure, and also because the oil jet member 55 is provided in the balancer housing 17, the oil passage interconnecting the reservoir chamber 35b and the oil jet member 55 can be simplified.

The embodiment of the present invention has been described above, but various changes in design may be made without departing from the subject matter of the present invention.

In the embodiment, the secondary balancer device 16 has been described as an example, but the present invention is also applicable to a primary balancer device.

Further, the drive shaft and the follower shaft of the present invention are not limited to the crankshaft 20 and the drive balancer shaft 18.

Furthermore, the endless power transmitting member of the present invention is not limited to the balancer drive chain 23.

Moreover, the oil jet member of the present invention may be an oil jet member for lubricating any member other than the endless power transmitting member.

What is claimed is:

1. An engine comprising:
   a cylinder block;
   a crankshaft;
   a balancer housing mounted below the cylinder block;
   a balancer drive chain for transmitting a drive force between the crankshaft and a balancer shaft supported on the balancer housing;
   a hydraulic tensioner for providing tension to the balancer drive chain;
   an oil pump mounted at one end of the balancer shaft for supplying oil to the hydraulic tensioner;
   an end housing member mounted to one end of the balancer housing and providing an oil passage extending from a discharge port of the oil pump to the hydraulic tensioner;
   a reservoir chamber formed in the end housing member so as to be provided in the oil passage for storing the oil supplied to the hydraulic tensioner;
   a rear chamber provided on a downstream side of the reservoir chamber and communicated with the reservoir chamber through a constriction;
   an oil jet member which injects the oil to a lubricated portion of the balancer drive chain and which is mounted on the end housing member and communicates with the rear chamber.

2. An engine according to claim 1, wherein the hydraulic tensioner is mounted on the end housing member at a position surrounding the reservoir chamber.

3. An engine according to claim 1, wherein the discharge port of the oil pump is formed in the end housing member so as to be interposed between rotors of the oil pump and the reservoir chamber in an axial direction of the balancer shaft.

4. An engine according to claim 2, wherein the discharge port of the oil pump is formed in the end housing member so as to be interposed between rotors of the oil pump and the reservoir chamber in an axial direction of the balancer shaft.

5. An engine according to claim 1, wherein the balancer shaft comprises first and second balancer shafts supported on the balancer housing, and said hydraulic tensioner is provided around an extension of an axis of one of the first and second balancer shafts and the oil jet member is provided around an extension of an axis of the other balancer shaft.

\* \* \* \* \*